US012718731B2

(12) United States Patent
Peng et al.

(10) Patent No.: US 12,718,731 B2
(45) Date of Patent: Aug. 25, 2026

(54) DISPLAY COMPENSATION METHOD, DISPLAY SCREEN AND DISPLAY COMPENSATION DEVICE THEREFOR

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Bo Peng, Beijing (CN); Chienpang Huang, Beijing (CN); Ting Han, Beijing (CN); Yajun Li, Beijing (CN); Le Zhu, Beijing (CN); Gong Chen, Beijing (CN); Qiaoqiao Ru, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/881,327

(22) PCT Filed: Jul. 29, 2022

(86) PCT No.: PCT/CN2022/108930
§ 371 (c)(1),
(2) Date: Jan. 6, 2025

(87) PCT Pub. No.: WO2024/021013
PCT Pub. Date: Feb. 1, 2024

(65) Prior Publication Data

US 2025/0391308 A1 Dec. 25, 2025

(51) Int. Cl.
*G09G 3/20* (2006.01)
*G09G 3/3208* (2016.01)
*H04N 25/71* (2023.01)

(52) U.S. Cl.
CPC .......... *G09G 3/2074* (2013.01); *H04N 25/71* (2023.01); *G09G 3/3208* (2013.01);
(Continued)

(58) Field of Classification Search
CPC .............. G09G 3/2074; G09G 3/3208; G09G 2320/0233; G09G 2320/0242; G09G 2320/0666; G09G 2320/0686; H04N 25/71
See application file for complete search history.

(56) References Cited

U.S. PATENT DOCUMENTS

| | | | | |
|---|---|---|---|---|
| 2020/0035172 | A1* | 1/2020 | Chen | G09G 5/06 |
| 2021/0233481 | A1* | 7/2021 | Ryu | G09G 5/18 |

FOREIGN PATENT DOCUMENTS

| | | |
|---|---|---|
| CN | 111462693 A | 7/2020 |
| WO | 2022022025 A1 | 2/2022 |

* cited by examiner

*Primary Examiner* — Kwang-Su Yang
(74) *Attorney, Agent, or Firm* — Calfee, Halter & Griswold LLP

(57) ABSTRACT

A display screen, and a display compensation method and display compensation device therefor. The display compensation method includes: acquiring actual measured brightness values of sub-pixel units in the display screen at target gray scales; mapping the actual measured brightness values to actual measured gray scales; establishing a function model relating compensation gray scale (dependent variable) to drive gray scale (independent variable); determining a constant of the function model based on the target gray scales and the actual measured gray scales and calculating compensation gray scales; acquiring a parameter which
(Continued)

characterizes a degree of difference between the compensation gray scale and the corresponding target gray scale; and determining optimal compensation gray scales based on the parameter.

20 Claims, 3 Drawing Sheets

(52) U.S. Cl.
CPC ............... *G09G 2320/0233* (2013.01); *G09G 2320/0242* (2013.01); *G09G 2320/0666* (2013.01); *G09G 2320/0686* (2013.01)

DISPLAY COMPENSATION METHOD, DISPLAY SCREEN AND DISPLAY COMPENSATION DEVICE THEREFOR

CROSS-REFERENCE TO RELATED APPLICATIONS

The present disclosure is a U.S. National phase application of International Application No. PCT/CN2022/108930, filed on Jul. 29, 2022, the entire contents of which are incorporated herein by reference in its entirety.

TECHNICAL FIELD

The present disclosure relates to the field of display technology, and in particular, to a display screen and a display compensation method and display compensation device therefor.

BACKGROUND

In the related art, some display screens include a plurality of sub-display areas. For example, a spliced screen includes a plurality of sub-display screens. However, different sub-display areas are limited by factors such as production line processes, material differences, and color correction errors. There are certain differences in display brightness and the like among different sub-display areas, resulting in poor display uniformity of the display screen.

It should be noted that the information disclosed above in the "BACKGROUND" section is only used to enhance the understanding of the background of the present disclosure and may therefore include information that does not constitute prior art known to those of ordinary skill in the art.

SUMMARY

According to one aspect of the present disclosure, a display compensation method for a display screen is provided. The compensation method includes:

- acquiring actual measured brightness values of sub-pixel units in the display screen at a plurality of target gray scales, and using a preset mapping relationship to obtain actual measured gray scales according to the actual measured brightness values, where the preset mapping relationship includes a mapping relationship between the actual measured brightness value and the actual measured gray scale;
- establishing a function model of a compensation gray scale and a drive gray scale, where the compensation gray scale is a dependent variable, the drive gray scale is an independent variable, and the function model includes at least one undetermined constant;
- performing a constant acquisition operation at least once, where the constant acquisition operation includes: substituting at least one target gray scale of the plurality of target gray scales into the dependent variable of the function model, and substituting the actual measured gray scale corresponding to the at least one target gray scale into the independent variable of the function model to construct an equation including the undetermined constant, and acquiring the undetermined constant based on at least one equation;
- substituting the actual measured gray scales corresponding to at least a portion of remaining target gray scales into the independent variable of the function model to obtain the compensation gray scales corresponding to the at least a portion of the remaining target gray scales;
- acquiring, based on the compensation gray scales obtained from the function model, a first parameter according to at least one group of the compensation gray scale and the target gray scale corresponding to the compensation gray scale, where the first parameter characterizes a degree of difference between the compensation gray scale and the corresponding target gray scale; and
- acquiring an optimal undetermined constant based on the first parameter, and acquiring the compensation gray scales corresponding to respective drive gray scales as optimal compensation gray scales based on the function model with the optimal undetermined constant.

In an exemplary embodiment of the present disclosure, acquiring the actual measured brightness values of the sub-pixel units in the display screen at the plurality of target gray scales includes:

- sending a data signal corresponding to the target gray scale to each sub-pixel in the display screen to illuminate the entire display screen; and
- acquiring the actual measured brightness value of each sub-pixel in the display screen.

In an exemplary embodiment of the present disclosure, the preset mapping relationship is:

$$GL=\left(L/\left(2^{j}-1\right)\right)^{1/gam}\times\left(2^{k}-1\right);$$

- where L represents the actual measured brightness value, GL represents the actual measured gray scale, gam represents a gamma value, and j and k are positive integers greater than or equal to 1.

In an exemplary embodiment of the present disclosure, establishing the function model of the compensation gray scale and the drive gray scale includes:

- expressing the compensation gray scale as a p-th order q-term polynomial of the drive gray scale, where p and q are positive integers greater than or equal to 1.

In an exemplary embodiment of the present disclosure, p equals 2 and q equals 3, and the function model is $Y=aX^2+bX+c$;

- where Y represents the compensation gray scale, X represents the drive gray scale, and a, b and c represent the undetermined constants.

In an exemplary embodiment of the present disclosure, the constant acquisition operation further includes:

- randomly acquiring at least one group of the target gray scale and the actual measured gray scale corresponding to the target gray scale; and
- acquiring the undetermined constant based on the randomly acquired target gray scale and the corresponding actual measured gray scale.

In an exemplary embodiment of the present disclosure, the constant acquisition operation further includes:

- acquiring at least one group of a specific target gray scale and the actual measured gray scale corresponding to the specific target gray scale; and
- acquiring the undetermined constant based on the acquired target gray scale and the corresponding actual measured gray scale.

In an exemplary embodiment of the present disclosure, acquiring, based on the compensation gray scales obtained from the function model, the first parameter according to the at least one group of the compensation gray scale and the target gray scale corresponding to the compensation gray scale, includes:

acquiring the first parameter based on a formula $$E = \sqrt{\frac{1}{n}\sum_{1}^{n}(Yi - Zi)^2},$$

where E represents the first parameter, Yi represents the compensation gray scale obtained from the function model, Zi represents the target gray scale corresponding to Yi, n represents a number of groups of compensation gray scales and target gray scales, and i represents a $i^{th}$ group of the n groups of the compensation gray scales and the target gray scales.

In an exemplary embodiment of the present disclosure, substituting the actual measured gray scales corresponding to the at least a portion of the remaining target gray scales into the independent variable of the function model to obtain the compensation gray scales corresponding to the at least a portion of the remaining target gray scales, includes:

substituting the actual measured gray scales corresponding to all of the remaining target gray scales into the independent variable of the function model to obtain the compensation gray scales corresponding to all of the remaining target gray scales; and where acquiring the first parameter according to the at least one group of the compensation gray scale and the target gray scale corresponding to the compensation gray scale includes:

acquiring, based on the compensation gray scales obtained from the function model, the first parameter according to all of the compensation gray scales and the target gray scales corresponding to the all of the compensation gray scales.

In an exemplary embodiment of the present disclosure, the first parameter is positively correlated with the degree of difference; where acquiring the optimal undetermined constant based on the first parameter includes:

comparing the first parameter with a preset value;

in response to the first parameter being less than the preset value, determining the undetermined constant corresponding to the first parameter as the optimal undetermined constant;

in response to the first parameter being greater than the preset value, repeating the constant acquisition operation until the first parameter is less than the preset value.

In an exemplary embodiment of the present disclosure, the preset value ranges from 0.5 to 1.

In an exemplary embodiment of the present disclosure, the first parameter is positively correlated with the degree of difference;

where acquiring the optimal undetermined constant based on the first parameter includes:

after acquiring the first parameter, repeating the constant acquisition operation to reacquire the first parameter; and comparing a plurality of first parameters, and acquiring the undetermined constant corresponding to the first parameter with the smallest value of the plurality of first parameters as the optimal undetermined constant.

In an exemplary embodiment of the present disclosure, the first parameter is positively correlated with the degree of difference, where performing the constant acquisition operation at least once includes:

performing the constant acquisition operation a plurality of times to obtain a plurality of groups of undetermined constants; and acquiring a plurality of first parameters based on the plurality of groups of undetermined constants, respectively; and where acquiring the optimal undetermined constant based on the first parameter includes:

comparing values of the plurality of first parameters, and acquiring the undetermined constant corresponding to the first parameter with the smallest value of the plurality of first parameters as the optimal undetermined constant.

In an exemplary embodiment of the present disclosure, each target gray scale participates in the constant acquisition operation at least once.

In an exemplary embodiment of the present disclosure, the constant acquisition operation is performed a plurality of times until all combinations of the target gray scales are exhausted.

In an exemplary embodiment of the present disclosure, among the compensation gray scales obtained from the function model, at least one compensation gray scale forms a first vector, and at least one target gray scale corresponding to the compensation gray scales forms a second vector; and the first parameter is any one of a Minkowski distance, a Euclidean distance, a Manhattan distance, or a Canberra distance, between the first vector and the second vector.

In an exemplary embodiment of the present disclosure, the constant acquisition operation further includes:

acquiring, in a low target gray scale region, a group of the target gray scale and the actual measured gray scale corresponding to the target gray scale;

acquiring, in a medium target gray scale region, another group of the target gray scale and the actual measured gray scale corresponding to the target gray scale;

acquiring, in a high target gray scale region, a yet another group of the target gray scale and the actual measured gray scale corresponding to the target gray scale; and acquiring the undetermined constant based on the three groups of the target gray scales and their respective corresponding actual measured gray scales.

According to one aspect of the present disclosure, a display screen is provided. The display screen includes:

a plurality of sub-display areas;

a storage device configured to store the drive gray scales and the optimal compensation gray scales corresponding to the drive gray scales obtained by the above compensation method;

a plurality of source drive circuits corresponding to the plurality of sub-display areas, where the source drive circuit is configured to acquire the drive gray scale and the optimal compensation gray scale corresponding to the drive gray scale from the storage unit, and provide the optimal compensation gray scale corresponding to a current drive gray scale to a sub-display area corresponding to the source drive circuit.

According to one aspect of the present disclosure, a display compensation device for a display screen is provided. The device includes:

a charge coupled device (CCD) camera configured to acquire actual measured brightness values of sub-pixel units in the display screen at a plurality of target gray scales; and a signal generator configured to:

use a preset mapping relationship to obtain actual measured gray scales according to the actual measured brightness values, where the preset mapping relationship includes a mapping relationship between the actual measured brightness value and the actual measured gray scale;

perform a constant acquisition operation at least once, where the constant acquisition operation includes: based on a function model, substituting at least one target gray scale of the plurality of target gray scales into a dependent variable of the function model, and substituting the actual measured gray scale corresponding to the at least one target gray scale into an independent variable of the function model to construct an equation including an undetermined constant, and acquiring the undetermined constant based on at least one equation; where, in the function model, a compensation gray scale is the dependent variable, a drive gray scale is the independent variable, and the function model includes at least one undetermined constant;

substitute the actual measured gray scales corresponding to at least a portion of remaining target gray scales into the independent variable of the function model to obtain the compensation gray scales corresponding to the at least a portion of the remaining target gray scales;

acquire, based on the compensation gray scales obtained from the function model, a first parameter according to at least one group of the compensation gray scale and the target gray scale corresponding to the compensation gray scale, where the first parameter characterizes a degree of difference between the compensation gray scale and the corresponding target gray scale; and acquire an optimal undetermined constant based on the first parameter, and acquiring the compensation gray scales corresponding to respective drive gray scales as optimal compensation gray scales based on the function model with the optimal undetermined constant.

In an exemplary embodiment of the present disclosure, the preset mapping relationship is:

$$GL = \left(L/\left(2^j - 1\right)\right)^{1/gam} \times \left(2^k - 1\right);$$

where L represents the actual measured brightness value, GL represents the actual measured gray scale, gam represents a gamma value, and j and k are positive integers greater than or equal to 1.

In an exemplary embodiment of the present disclosure, in the function model, the compensation gray scale is expressed as a p-th order q-term polynomial of the drive gray scale, where p and q are positive integers greater than or equal to 1.

In an exemplary embodiment of the present disclosure, p equals 2 and q equals 3, and the function model is $Y=aX^2+bX+c$;

where Y represents the compensation gray scale, X represents the drive gray scale, and a, b and c represent the undetermined constants.

In an exemplary embodiment of the present disclosure, the constant acquisition operation further includes:

randomly acquiring at least one group of the target gray scale and the actual measured gray scale corresponding to the target gray scale; and acquiring the undetermined constant based on the randomly acquired target gray scale and the corresponding actual measured gray scale.

In an exemplary embodiment of the present disclosure, the constant acquisition operation further includes:

acquiring at least one group of a specific target gray scale and the actual measured gray scale corresponding to the specific target gray scale; and acquiring the undetermined constant based on the acquired target gray scale and the corresponding actual measured gray scale.

In an exemplary embodiment of the present disclosure, acquiring, based on the compensation gray scales obtained from the function model, the first parameter according to the at least one group of the compensation gray scale and the target gray scale corresponding to the compensation gray scale, includes:

acquiring the first parameter based on a formula $$E = \sqrt{\frac{1}{n}\sum_{1}^{n}(Yi - Zi)^2},$$

where E represents the first parameter, Yi represents the compensation gray scale obtained from the function model, Zi represents the target gray scale corresponding to Yi, n represents a number of groups of compensation gray scales and target gray scales, and i represents a $i^{th}$ group of the n groups of the compensation gray scales and the target gray scales.

In an exemplary embodiment of the present disclosure, substituting the actual measured gray scales corresponding to the at least a portion of the remaining target gray scales into the independent variable of the function model to obtain the compensation gray scales corresponding to the at least a portion of the remaining target gray scales, includes:

substituting the actual measured gray scales corresponding to all of the remaining target gray scales into the independent variable of the function model to obtain the compensation gray scales corresponding to all of the remaining target gray scales; and where acquiring the first parameter according to the at least one group of the compensation gray scale and the target gray scale corresponding to the compensation gray scale includes:

acquiring, based on the compensation gray scales obtained from the function model, the first parameter according to all of the compensation gray scales and the target gray scales corresponding to the all of the compensation gray scales.

In an exemplary embodiment of the present disclosure, the first parameter is positively correlated with the degree of difference; where acquiring the optimal undetermined constant based on the first parameter includes:

comparing the first parameter with a preset value;

in response to the first parameter being less than the preset value, determining the undetermined constant corresponding to the first parameter as the optimal undetermined constant;

in response to the first parameter being greater than the preset value, repeating the constant acquisition operation until the first parameter is less than the preset value.

In an exemplary embodiment of the present disclosure, the preset value ranges from 0.5 to 1.

In an exemplary embodiment of the present disclosure, the first parameter is positively correlated with the degree of difference;

where acquiring the optimal undetermined constant based on the first parameter includes:

after acquiring the first parameter, repeating the constant acquisition operation to reacquire the first parameter; and comparing a plurality of first parameters, and acquiring the undetermined constant corresponding to the first parameter with the smallest value of the plurality of first parameters as the optimal undetermined constant.

In an exemplary embodiment of the present disclosure, the first parameter is positively correlated with the degree of difference; where performing the constant acquisition operation at least once includes:

performing the constant acquisition operation a plurality of times to obtain a plurality of groups of undetermined constants; and acquiring a plurality of first parameters based on the plurality of groups of undetermined constants, respectively; and where acquiring the optimal undetermined constant based on the first parameter includes:

comparing values of the plurality of first parameters, and acquiring the undetermined constant corresponding to the first parameter with the smallest value of the plurality of first parameters as the optimal undetermined constant.

In an exemplary embodiment of the present disclosure, each target gray scale participates in the constant acquisition operation at least once.

In an exemplary embodiment of the present disclosure, the constant acquisition operation is performed a plurality of times until all combinations of the target gray scales are exhausted.

In an exemplary embodiment of the present disclosure, among the compensation gray scales obtained from the function model, at least one compensation gray scale forms a first vector, and at least one target gray scale corresponding to the compensation gray scales forms a second vector; and the first parameter is any one of a Minkowski distance, a Euclidean distance, a Manhattan distance, or a Canberra distance, between the first vector and the second vector.

In an exemplary embodiment of the present disclosure, the constant acquisition operation further includes:

acquiring, in a low target gray scale region, a group of the target gray scale and the actual measured gray scale corresponding to the target gray scale;

acquiring, in a medium target gray scale region, another group of the target gray scale and the actual measured gray scale corresponding to the target gray scale;

acquiring, in a high target gray scale region, a yet another group of the target gray scale and the actual measured gray scale corresponding to the target gray scale; and acquiring the undetermined constant based on the three groups of the target gray scales and their respective corresponding actual measured gray scales.

It should be understood that the above general description and the following detailed description are only exemplary and explanatory and cannot limit the present disclosure.

BRIEF DESCRIPTION OF THE DRAWINGS

The drawings herein are incorporated into the specification and constitute a part of the specification, showing embodiments in accordance with the present disclosure and, together with the specification, are used to explain the principles of the present disclosure. Obviously, the drawings in the following description are only some embodiments of the present disclosure. Those of ordinary skill in the art can obtain other drawings based on these drawings without creative efforts.

DETAILED DESCRIPTION

Figure 1:
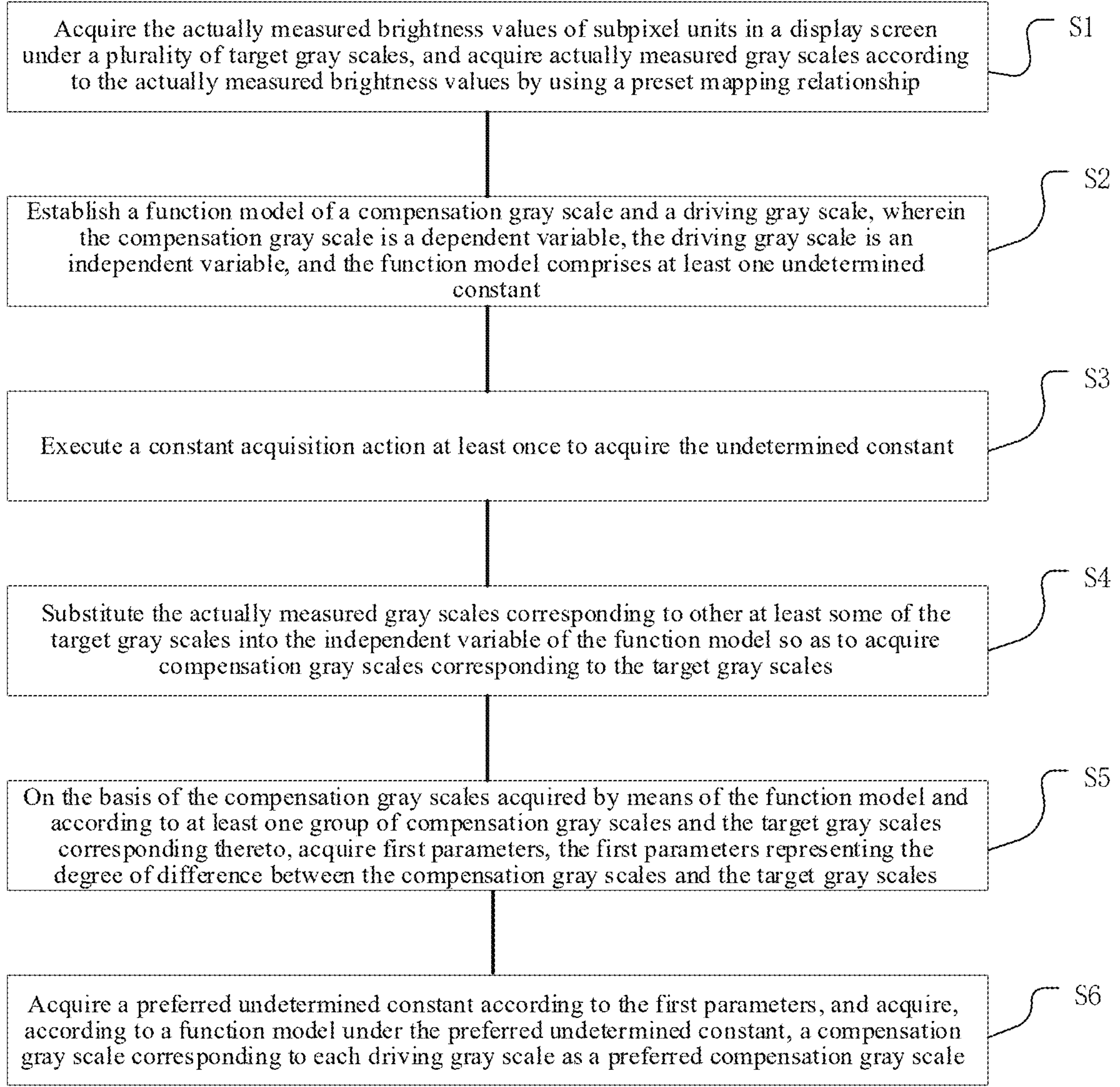
FIG. 1 is a flowchart of a display compensation method for a display screen of the present disclosure according to an exemplary embodiment.

Exemplary embodiments will now be described more fully with reference to the accompanying drawings. However, the exemplary embodiments can be implemented in various forms and should not be construed as being limited to the examples set forth herein; rather, these embodiments are provided so that the present disclosure will be more comprehensive and complete and will fully convey the concept of the exemplary embodiments to those skilled in the art. The same reference numerals in the figures denote the same or similar structures, and their detailed descriptions will be omitted.

The terms "a", "an", and "the" are used to indicate the existence of one or more elements/components/etc. The terms "comprise/include" and "has/have" are used to indicate an open-ended inclusion and mean that in addition to the listed elements/components/etc., there may be other elements/components/etc.

With the rapid development of display technology, Large Format Display (LFD) technology has gradually become a development demand in the display industry. Using a plurality of display screens for splicing to form an oversized spliced screen is one of the main ways to achieve large-screen display.

Spliced screens can be classified into LED liquid crystal spliced screens, OLED self-luminous spliced screens, and DLP rear-projection spliced screens according to the backlight source. As an organic light-emitting diode, OLED has self-luminous technology and no light leakage phenomenon when applied in the display field. At the same time, compared with LCD, OLED has advantages such as no liquid crystal layer, wider viewing angle, faster response, simpler structure, and ultra-thin design, making it easier to complete high-end splicing products such as seamless splicing, special-shaped splicing, and curved splicing. Therefore, in recent years, various domestic and foreign display panel manufacturers have gradually launched high-end OLED spliced screen products.

However, in spliced screen products, different sub-display screens are limited by factors such as production line processes, material differences, and color correction errors, resulting in certain differences in display brightness, etc., which leads to poor display uniformity of the spliced screen.

Based on this, this exemplary embodiment provides a display compensation method for a display screen. As shown in FIG. 1, it is a flowchart of a display compensation method for a display screen of the present disclosure according to an exemplary embodiment. The display screen may include a plurality of sub-display areas, and the compensation method may include the following steps.

Step S1, acquiring actual measured brightness values of sub-pixel units in the display screen at a plurality of target gray scales, and using a preset mapping relationship to obtain actual measured gray scales according to the actual measured brightness values, where the preset mapping relationship includes a mapping relationship between the actual measured brightness value and the actual measured gray scale.

Step S2, establishing a function model of a compensation gray scale and a drive gray scale, where the compensation gray scale is a dependent variable, the drive gray scale is an independent variable, and the function model includes at least one undetermined constant.

Step S3, performing a constant acquisition operation at least once, where the constant acquisition operation includes: substituting at least one target gray scale of the plurality of target gray scales into the dependent variable of the function model, and substituting the actual measured gray scale corresponding to the at least one target gray scale into the independent variable of the function model to construct an equation including the undetermined constant, and acquiring the undetermined constant based on at least one equation.

Step S4, substituting the actual measured gray scales corresponding to at least a portion of remaining target gray scales into the independent variable of the function model to obtain the compensation gray scales corresponding to the at least a portion of the remaining target gray scales.

Step S5, acquiring, based on the compensation gray scales obtained from the function model, a first parameter according to at least one group of the compensation gray scale and the target gray scale corresponding to the compensation gray scale, where the first parameter characterizes a degree of difference between the compensation gray scale and the corresponding target gray scale.

Step S6, acquiring an optimal undetermined constant based on the first parameter, and acquiring the compensation gray scales corresponding to respective drive gray scales as optimal compensation gray scales based on the function model with the optimal undetermined constant.

In this exemplary embodiment, on the one hand, this display compensation method uses the same preset mapping relationship to obtain the actual measured gray scales corresponding to each sub-pixel in each sub-display area at the target gray scales, establishes a function model of the drive gray scale and the compensation gray scale, and acquires the undetermined constant(s) in the function model based on the target gray scales and their corresponding actual measured gray scales. This display compensation method can improve the brightness uniformity of the sub-display areas at the same gray scale. On the other hand, this display compensation method quantitatively analyzes the degree of difference between the compensation gray scales and the actual measured gray scales through the first parameter to select the optimal undetermined constant, which can greatly eliminate the decrease in compensation accuracy caused by measurement errors of the actual measured brightness values.

In this exemplary embodiment, the display screen can be a spliced screen, and each sub-display area corresponds to each sub-display screen in the spliced screen. It should be understood that in other exemplary embodiments, the display screen provided by the present disclosure can also be other display screens, such as a large-size display screen, a foldable display screen, etc.

Figure 2:
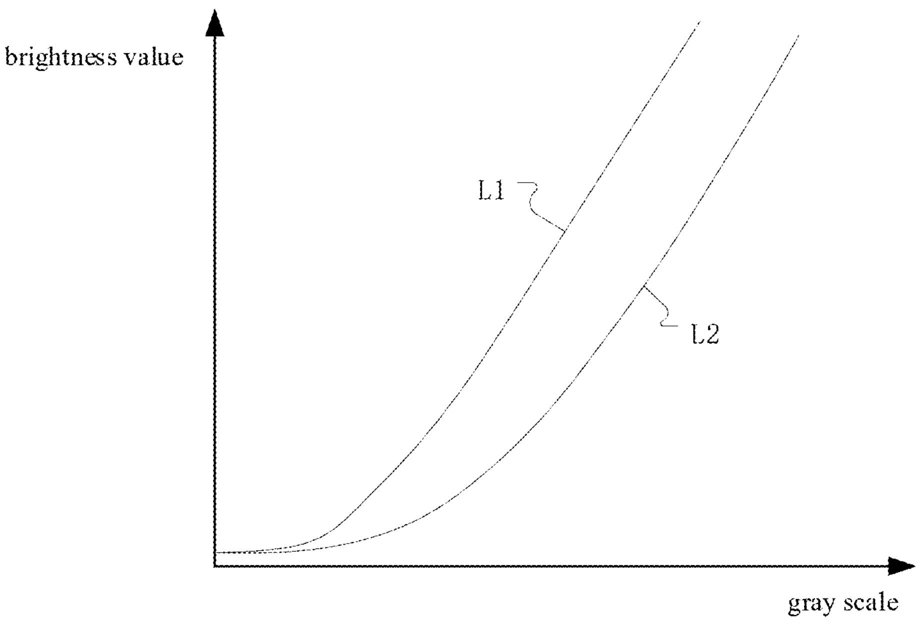
FIG. 2 is a curve showing a relationship between brightness values and gray scales in a display compensation method for a display screen of the present disclosure.

As shown in FIG. 2, it is a curve showing the relationship between brightness values and gray scales in the display compensation method for the display screen of the present disclosure. In the coordinate system shown in FIG. 2, the abscissa represents the gray scale, and the ordinate represents the brightness value. L1 represents the actual relationship curve between the gray scale and the brightness value of a sub-pixel in the display screen, and L2 represents the target relationship curve between the gray scale and the brightness value. That is, L2 is the relationship curve between the actual measured brightness and the actual measured gray scale in a preset mapping relationship. In fact, this display compensation method compensates the gray scale of each sub-pixel in the display screen according to the same preset mapping relationship, so that the brightness of each sub-pixel is the same or similar at the same gray scale.

The following describes the above steps in detail in this exemplary embodiment.

Step S1, acquiring actual measured brightness values of sub-pixel units in the display screen at a plurality of target gray scales, and using a preset mapping relationship to obtain actual measured gray scales according to the actual measured brightness values, where the preset mapping relationship includes a mapping relationship between the actual measured brightness value and the actual measured gray scale.

Figure 3:
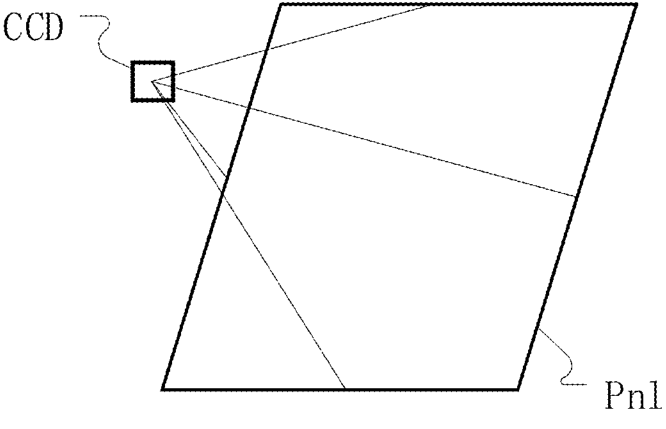
FIG. 3 is a schematic diagram of a working mode of a charge coupled device (CCD) camera for acquiring brightness values.

In this exemplary embodiment, acquiring the actual measured brightness values of the sub-pixel units in the display screen at the plurality of target gray scales may include:

sending a data signal corresponding to the target gray scale to each sub-pixel in the display screen to illuminate the entire display screen; and using a CCD camera to acquire the actual measured brightness value of each sub-pixel in the display screen. For example, the display screen can be an 8-bit display panel, and the gray scale of the display screen ranges from 0 to 255. This display compensation method can detect the actual measured brightness value of each sub-pixel in the display screen at each target gray scale in the range of 0 to 255. As shown in FIG. 3, it is a schematic diagram of a working mode of the CCD camera for acquiring brightness values. When using the CCD camera CCD to acquire the actual measured brightness value of each sub-pixel in the display screen Pnl, the CCD camera can be set on one side of the center position of the display screen Pnl, which can improve the accuracy of the CCD camera in acquiring the brightness value of each sub-pixel on the display screen.

In this exemplary embodiment, the preset mapping relationship can be:

$$GL=\left(L/\left(2^{j}-1\right)\right)^{1/gam}\times\left(2^{k}-1\right);$$

where L represents the actual measured brightness value, GL represents the actual measured gray scale, gam represents a gamma value, and j and k are positive integers greater than or equal to 1.

In this exemplary embodiment, the gamma value can be taken in the range of 2.0 to 2.4. For example, the gamma value can be 2.0, 2.2, or 2.4. $2^{K}-1$ is the maximum gray scale value after the gray scale of the display panel is normalized. For example, in an 8-bit display panel, k can be equal to 8, and the maximum gray scale value of the display panel is 255. $2^{j}-1$ is the maximum actual measured brightness value after the brightness of the display panel is normalized. This display compensation method can use the above preset mapping relationship to obtain the actual measured gray scale of each sub-pixel at each target gray scale based on the actual measured brightness value.

Step S2, establishing a function model of a compensation gray scale and a drive gray scale, where the compensation gray scale is a dependent variable, the drive gray scale is an independent variable, and the function model includes at least one undetermined constant.

In this exemplary embodiment, establishing the function model of the compensation gray scale and the drive gray scale may include:

expressing the compensation gray scale as a p-th order q-term polynomial of the drive gray scale, where p and q are positive integers greater than or equal to 1. For example, p can be equal to 2, and q can be equal to 3. Correspondingly, the function model can be $Y=aX^2+bX+c$, where Y represents the compensation gray scale, X represents the drive gray scale, and a, b and c represent the undetermined constants. Here, c can be understood as the zero-order term of X. It should be understood that in other exemplary embodiments, the function model can also have other structures. For example, the function model can be $Y=aX^3+bX^2+cX+d$, or $Y=aX+b$, etc. Here, Y represents the compensation gray scale, X represents the drive gray scale, and a, b, c, and d represent the undetermined constants. For another example, the function model can also be an exponential function, a logarithmic function, etc.

Step S3, performing a constant acquisition operation at least once, where the constant acquisition operation includes: substituting at least one target gray scale of the plurality of target gray scales into the dependent variable of the function model, and substituting the actual measured gray scale corresponding to the at least one target gray scale into the independent variable of the function model to construct an equation including the undetermined constant, and acquiring the undetermined constant based on at least one equation.

In this exemplary embodiment, the constant acquisition operation may also include:

randomly acquiring at least one group of the target gray scale and the actual measured gray scale corresponding to the target gray scale; and acquiring the undetermined constant based on the randomly acquired target gray scale and the corresponding actual measured gray scale.

Here, the number of groups of randomly acquired target gray scales and their corresponding actual measured gray scales is related to the function model. When the function model includes k1 undetermined constants, correspondingly, k1 groups of target gray scales and their corresponding actual measured gray scales need to be acquired. For example, when the function model is $Y=aX^2+bX+c$, this display compensation method can randomly acquire three groups of target gray scales and their corresponding actual measured gray scales and construct the following system of equations through the three groups of target gray scales and their corresponding actual measured gray scales:

$$\begin{cases} y_1 = ax_1^2 + bx_1 + c \\ y_2 = ax_2^2 + bx_2 + c, \\ y_3 = ax_3^2 + bx_3 + c \end{cases}$$

where $y_1$, $y_2$, and $y_3$ are three target gray scales respectively, $x_1$ is the actual measured gray scale corresponding to $y_1$, $x_2$ is the actual measured gray scale corresponding to $y_2$, and $x_3$ is the actual measured gray scale corresponding to $y_3$. The values of the undetermined constants a, b, and c can be solved through the above equations.

In this exemplary embodiment, the target gray scales are acquired randomly. It should be understood that in other exemplary embodiments, the target gray scales can also be specific gray scales. The constant acquisition operation may also include:

acquiring at least one group of a specific target gray scale and the actual measured gray scale corresponding to the specific target gray scale; and acquiring the undetermined constant based on the acquired target gray scale and the corresponding actual measured gray scale.

For example, the constant acquisition operation may include:

acquiring, in a low target gray scale region, a group of the target gray scale and the actual measured gray scale corresponding to the target gray scale;

acquiring, in a medium target gray scale region, another group of the target gray scale and the actual measured gray scale corresponding to the target gray scale;

acquiring, in a high target gray scale region, a yet another group of the target gray scale and the actual measured gray scale corresponding to the target gray scale; and acquiring the undetermined constant based on the three groups of the target gray scales and their respective corresponding actual measured gray scales. This compensation method acquires three groups of target gray scales and their corresponding measured gray scales in different gray scale regions, respectively. The undetermined constants obtained by this method can better match the drive gray scales and compensation gray scales in different gray scale ranges. In addition, selecting specific target gray scales can also avoid repeated selection of target gray scales. In addition, the low target gray scale region, the medium target gray scale region, and the high target gray scale region can be divided according to the actual situation. For example, the low target gray scale region can be a region from 0 grayscale to 40 grayscale, the medium target gray scale region can be a region from 41 grayscale to 100 grayscale, and the high target gray scale region can be a region from 101 grayscale to 255 grayscale.

Step S4, substituting the actual measured gray scales corresponding to at least a portion of remaining target gray scales into the independent variable of the function model to obtain the compensation gray scales corresponding to the at least a portion of the remaining target gray scales.

In this exemplary embodiment, the actual measured gray scales corresponding to all of the remaining target gray scales can be substituted into the independent variable of the function model to obtain the compensation gray scales corresponding to the target gray scales. Here, "remaining target gray scale" refers to a target gray scale other than the target gray scale involved in the constant acquisition operation. For example, in step S3, when acquiring the above equations, three target gray scales and three corresponding actual measured gray scales are used. Then, in step S4, 253 actual measured gray scales corresponding to 253 target gray scales other than the above three gray scales can be substituted into the function model to obtain 253 compensation gray scales. It should be understood that in other exemplary embodiments, this display compensation method can also only acquire a portion of the remaining target gray scales to reduce the calculation difficulty. For example, only 200 compensation gray scales or 100 compensation gray scales can be acquired.

Step S5, acquiring, based on the compensation gray scales obtained from the function model, a first parameter according to at least one group of the compensation gray scale and the target gray scale corresponding to the compensation gray scale, where the first parameter characterizes a degree of difference between the compensation gray scale and the corresponding target gray scale.

In this exemplary embodiment, acquiring the first parameter according to at least one group of the compensation gray scale and the target gray scale corresponding to the compensation gray scale may include: based on the compensation gray scales obtained from the function model, acquiring the first parameter according to all compensation gray scales and their corresponding target gray scales. That is, the first parameter is acquired according to the 253 compensation gray scales and their corresponding 253 target gray scales.

In this exemplary embodiment, the first parameter can be acquired according to the formula $$E = \sqrt{\frac{1}{n}\sum_{1}^{n}(Yi - Zi)^2}.$$

Here, E is the first parameter, Yi is the compensation gray scale, Zi is the target gray scale corresponding to Yi, and n is the number of groups of compensation gray scales and target gray scales. For example, the 253 groups of compensation gray scales and target gray scales can be substituted into the formula $$E = \sqrt{\frac{1}{n}\sum_{1}^{n}(Yi - Zi)^2}.$$

It should be understood that there are other formulas for calculating the first parameter. For example, in this exemplary embodiment, n compensation gray scales can form an n-dimensional first vector, and n target gray scales can form an n-dimensional second vector. The first parameter can also be any one of the Minkowski distance, Euclidean distance, Manhattan distance, Canberra distance, or covariance between the first vector and the second vector. Depending on the different calculation formulas of the first parameter, the first parameter can be positively or negatively correlated with the degree of difference.

Step S6, acquiring an optimal undetermined constant based on the first parameter, and acquiring the compensation gray scales corresponding to respective drive gray scales as optimal compensation gray scales based on the function model with the optimal undetermined constant.

In this exemplary embodiment, the first parameter can be positively correlated with the degree of difference, that is, the smaller the first parameter, the smaller the degree of difference. In this exemplary embodiment, in step S3, the constant acquisition operation can be performed once. Acquiring the optimal undetermined constant based on the first parameter may include:

comparing the size of the first parameter with a preset value;

when the first parameter is less than the preset value, determining the undetermined constant corresponding to the first parameter as the optimal undetermined constant;

when the first parameter is greater than the preset value, repeating the constant acquisition operation in step S3 until the first parameter is less than the preset value, and determining the undetermined constant corresponding to the first parameter less than the preset value as the optimal undetermined constant. Here, the preset value can range from 0.5 to 1. For example, the preset value can be 0.5, 0.8, 0.9, or 1. This method for acquiring the optimal undetermined constant can reduce the number of times of the undetermined constant acquisition operation, thereby reducing the calculation difficulty.

It should be understood that in other exemplary embodiments, there can also be other ways to acquire the optimal undetermined constant based on the first parameter. For example, the first parameter can be positively correlated with the degree of difference. Acquiring the optimal undetermined constant based on the first parameter may include:

after acquiring the first parameter, repeating the constant acquisition operation to reacquire the first parameter; and comparing a plurality of first parameters and acquiring the undetermined constant corresponding to the first parameter with the smallest value of the plurality of first parameters as the optimal undetermined constant.

In this exemplary embodiment, the number of times of performing the constant acquisition operation can be limited according to the actual situation. In order to obtain better undetermined constants, each target gray scale needs to participate in the constant acquisition operation at least once. For example, the constant acquisition operation can also be performed a plurality of times to exhaust all combinations of the target gray scales. Here, the number of all combinations of the target gray scales is $$C_{255}^{3}.$$

For another example, the first parameter can be positively correlated with the degree of difference. Performing the constant acquisition operation at least once includes:

performing the constant acquisition operation a plurality of times to obtain a plurality of groups of undetermined constants; and acquiring a plurality of groups of first parameters based on the plurality of groups of undetermined constants, respectively;

where acquiring the optimal undetermined constant based on the first parameter may include:

comparing values of the plurality of first parameters, and acquiring the undetermined constant corresponding to the first parameter with the smallest value of the plurality of first parameters as the optimal undetermined constant.

In this exemplary embodiment, the number of times of performing the constant acquisition operation can be limited according to the actual situation. In order to obtain better undetermined constants, each target gray scale needs to participate in the constant acquisition operation at least once. The constant acquisition operation can also be performed a plurality of times to exhaust all combinations of the target gray scales. Here, the number of all combinations of the target gray scales is $C_{255}^{3}$.

It should be noted that the above compensation method is not necessarily carried out step by step as shown in FIG. 1. For example, step S2 can also be carried out before step S1.

Figure 4:
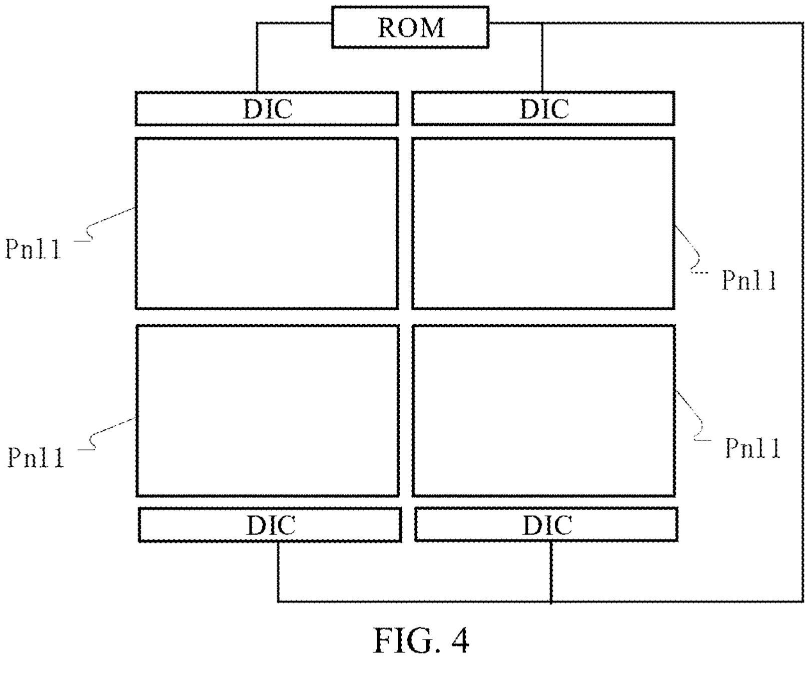
FIG. 4 is a schematic structural diagram of a display screen of the present disclosure according to an exemplary embodiment.

This exemplary embodiment also provides a display screen. As shown in FIG. 4, it is a schematic structural diagram of a display screen of the present disclosure according to an exemplary embodiment. The display screen includes: a plurality of sub-display areas pnl1, a storage unit ROM, and a plurality of source drive circuits DIC. The storage unit ROM can be used to store the drive gray scales and the optimal compensation gray scales corresponding to the drive gray scales obtained by the above compensation method. The plurality of source drive circuits DIC are arranged corresponding to the plurality of sub-display areas Pnl1. The source drive circuit DIC is configured to acquire the drive gray scale and the optimal compensation gray scale corresponding to the drive gray scale from the storage unit ROM, and provide the optimal compensation gray scale corresponding to a current drive gray scale to a sub-display area corresponding to the source drive circuit. Here, the drive gray scale is a gray scale before compensation, and the optimal compensation gray scale is a gray scale after compensation. The storage unit ROM can be a read-only memory. In this exemplary embodiment, the display screen is illustrated with four sub-display areas Pnl1. It should be understood that in other exemplary embodiments, the display screen can also include other numbers of sub-display areas. In addition, in other exemplary embodiments, there can also be a plurality of storage units ROM. The plurality of storage units can be arranged in one-to-one correspondence with the plurality of source drive circuits, and the storage units can be integrated into their corresponding source drive circuits.

In this exemplary embodiment, the display screen can be a spliced screen, and each sub-display area corresponds to each sub-display screen in the spliced screen. It should be understood that in other exemplary embodiments, the display screen provided by the present disclosure can also be other display screens, such as a large-size display screen, a foldable display screen, etc.

Figure 5:
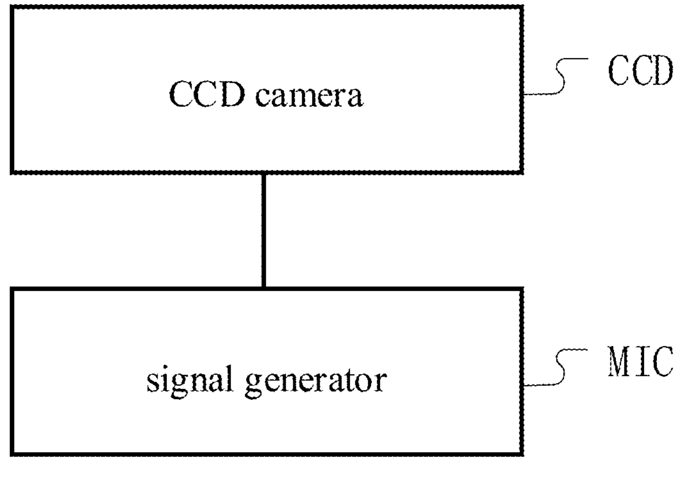
FIG. 5 is a schematic structural diagram of a display compensation device for a display screen of the present disclosure according to an exemplary embodiment.

This exemplary embodiment also provides a display compensation device for a display screen. As shown in FIG. 5, it is a schematic structural diagram of a display compensation device for a display screen of the present disclosure according to an exemplary embodiment. The display compensation device for the display screen includes: a CCD camera CCD and a signal generator MIC. The CCD camera is used to acquire actual measured brightness values of sub-pixel units in the display screen at a plurality of target gray scales. The signal generator MIC can be used to:

use a preset mapping relationship to obtain actual measured gray scales according to the actual measured brightness values, where the preset mapping relationship includes a mapping relationship between the actual measured brightness value and the actual measured gray scale;

perform a constant acquisition operation at least once, where the constant acquisition operation includes: based on a function model, substituting at least one target gray scale of the plurality of target gray scales into a dependent variable of the function model, and substituting the actual measured gray scale corresponding to the at least one target gray scale into an independent variable of the function model to construct an equation including an undetermined constant, and acquiring the undetermined constant based on at least one equation; where, in the function model, a compensation gray scale is the dependent variable, a drive gray scale is the independent variable, and the function model comprises at least one undetermined constant;

substitute the actual measured gray scales corresponding to at least a portion of remaining target gray scales into the independent variable of the function model to obtain the compensation gray scales corresponding to the at least a portion of the remaining target gray scales;

acquire, based on the compensation gray scales obtained from the function model, a first parameter according to at least one group of the compensation gray scale and the target gray scale corresponding to the compensation gray scale, where the first parameter characterizes a degree of difference between the compensation gray scale and the target gray scale; and acquire an optimal undetermined constant based on the first parameter, and acquiring the compensation gray scales corresponding to respective drive gray scales as optimal compensation gray scales based on the function model with the optimal undetermined constant.

In this exemplary embodiment, the compensation algorithm executed by the signal generator MIC can be the same as the above compensation method, and will not be repeated here.

Those skilled in the art, upon considering the specification and practicing the contents disclosed herein, will readily conceive of other embodiments of the present disclosure. This application is intended to cover any variations, uses, or adaptive modifications of the present disclosure that follow the general principles thereof and include common knowledge or customary technical means in the technical field not explicitly disclosed herein. The specification and embodiments are to be regarded as exemplary only, and the true scope and spirit of the present disclosure are indicated by the claims.

It should be understood that the present disclosure is not limited to the precise structures that have been described above and shown in the accompanying drawings, and various modifications and changes may be made without departing from its scope. The scope of the present disclosure is limited only by the appended claims.

What is claimed is:

1. A display compensation method for a display screen, comprising:

acquiring actual measured brightness values of sub-pixel units in the display screen at a plurality of target gray scales, and using a preset mapping relationship to obtain actual measured gray scales according to the actual measured brightness values, wherein the preset mapping relationship comprises a mapping relationship between the actual measured brightness values and the actual measured gray scales;

establishing a function model of a compensation gray scale and a drive gray scale, wherein the compensation gray scale is a dependent variable, the drive gray scale is an independent variable, and the function model comprises at least one undetermined constant;

performing a constant acquisition operation at least once, wherein the constant acquisition operation comprises: substituting at least one target gray scale of the plurality of target gray scales into the dependent variable of the function model, and substituting the actual measured gray scales corresponding to the at least one target gray scale into the independent variable of the function model to construct at least one equation comprising the undetermined constant, and acquiring the undetermined constant based on the at least one equation;

substituting the actual measured gray scales corresponding to at least a portion of remaining target gray scales into the independent variable of the function model to obtain the compensation gray scales corresponding to the at least a portion of the remaining target gray scales;

acquiring, based on the compensation gray scales obtained from the function model, a first parameter according to at least one group of the compensation gray scale and the target gray scale corresponding to the compensation gray scale, wherein the first parameter characterizes a degree of difference between the compensation gray scale and the corresponding target gray scale; and acquiring an optimal undetermined constant based on the first parameter, and acquiring the compensation gray scales corresponding to respective drive gray scales as optimal compensation gray scales based on the function model with the optimal undetermined constant.

2. The display compensation method for the display screen according to claim 1, wherein acquiring the actual measured brightness values of the sub-pixel units in the display screen at the plurality of target gray scales comprises:

sending a data signal corresponding to the target gray scale to each sub-pixel in the display screen to illuminate the entire display screen; and acquiring the actual measured brightness value of each sub-pixel in the display screen.

3. The display compensation method for the display screen according to claim 1, wherein the preset mapping relationship is:

$$GL = \left(L/(2^j - 1)\right)^{1/gam} \times (2^k - 1);$$

wherein L represents the actual measured brightness value, GL represents the actual measured gray scale, gam represents a gamma value, and j and k are positive integers greater than or equal to 1.

4. The display compensation method for the display screen according to claim 1, wherein establishing the function model of the compensation gray scale and the drive gray scale comprises:

expressing the compensation gray scale as a p-th order q-term polynomial of the drive gray scale, wherein p and q are positive integers greater than or equal to 1.

5. The display compensation method for the display screen according to claim 4, wherein p equals 2 and q equals 3, and the function model is $Y=aX^2+bX+c$;

wherein Y represents the compensation gray scale, X represents the drive gray scale, and a, b and c represent the undetermined constants.

6. The display compensation method for the display screen according to claim 1, wherein the constant acquisition operation further comprises:

randomly acquiring at least one group of the target gray scale and the actual measured gray scale corresponding to the target gray scale; and acquiring the undetermined constant based on the randomly acquired target gray scale and the corresponding actual measured gray scale.

7. The display compensation method for the display screen according to claim 1, wherein the constant acquisition operation further comprises:

acquiring at least one group of a specific target gray scale and the actual measured gray scale corresponding to the specific target gray scale; and acquiring the undetermined constant based on the acquired target gray scale and the corresponding actual measured gray scale.

8. The display compensation method for the display screen according to claim 7, wherein the constant acquisition operation further comprises:

acquiring, in a low target gray scale region, a group of the target gray scale and the actual measured gray scale corresponding to the target gray scale;

acquiring, in a medium target gray scale region, another group of the target gray scale and the actual measured gray scale corresponding to the target gray scale;

acquiring, in a high target gray scale region, a yet another group of the target gray scale and the actual measured gray scale corresponding to the target gray scale; and acquiring the undetermined constant based on the three groups of the target gray scales and respective corresponding actual measured gray scales.

9. The display compensation method for the display screen according to claim 1, wherein acquiring, based on the compensation gray scales obtained from the function model, the first parameter according to the at least one group of the compensation gray scale and the target gray scale corresponding to the compensation gray scale, comprises:

acquiring the first parameter based on a formula $$E = \sqrt{\frac{1}{n}\sum_{1}^{n}(Yi-Zi)^2},$$

wherein E represents the first parameter, Yi represents the compensation gray scale obtained from the function model, Zi represents the target gray scale corresponding to Yi, n represents a number of groups of compensation gray scales and target gray scales, and i represents a $i^{th}$ group of the n groups of the compensation gray scales and the target gray scales.

10. The display compensation method for the display screen according to claim 1, wherein substituting the actual measured gray scales corresponding to the at least a portion of the remaining target gray scales into the independent variable of the function model to obtain the compensation gray scales corresponding to the at least a portion of the remaining target gray scales, comprises:

substituting the actual measured gray scales corresponding to all of the remaining target gray scales into the independent variable of the function model to obtain the compensation gray scales corresponding to all of the remaining target gray scales; and wherein acquiring the first parameter according to the at least one group of the compensation gray scale and the target gray scale corresponding to the compensation gray scale comprises:

acquiring, based on the compensation gray scales obtained from the function model, the first parameter according to all of the compensation gray scales and the target gray scales corresponding to the all of the compensation gray scales.

11. The display compensation method for the display screen according to claim 1, wherein the first parameter is positively correlated with the degree of difference; and wherein acquiring the optimal undetermined constant based on the first parameter comprises:

comparing the first parameter with a preset value;

in response to the first parameter being less than the preset value, determining the undetermined constant corresponding to the first parameter as the optimal undetermined constant; and in response to the first parameter being greater than the preset value, repeating the constant acquisition operation until the first parameter is less than the preset value.

12. The display compensation method for the display screen according to claim 11, wherein the preset value ranges from 0.5 to 1.

13. The display compensation method for the display screen according to claim 1, wherein the first parameter is positively correlated with the degree of difference; and wherein acquiring the optimal undetermined constant based on the first parameter comprises:

after acquiring the first parameter, repeating the constant acquisition operation to reacquire the first parameter; and comparing a plurality of first parameters, and acquiring the undetermined constant corresponding to the first parameter with the smallest value of the plurality of first parameters as the optimal undetermined constant.

14. The display compensation method for the display screen according to claim 13, wherein each target gray scale participates in the constant acquisition operation at least once.

15. The display compensation method for the display screen according to claim 14, wherein the constant acquisition operation is performed a plurality of times until all combinations of the target gray scales are exhausted.

16. The display compensation method for the display screen according to claim 1, wherein the first parameter is positively correlated with the degree of difference, wherein performing the constant acquisition operation at least once comprises:

performing the constant acquisition operation a plurality of times to obtain a plurality of groups of undetermined constants; and acquiring a plurality of first parameters based on the plurality of groups of undetermined constants, respectively, and wherein acquiring the optimal undetermined constant based on the first parameter comprises:

comparing values of the plurality of first parameters; and acquiring the undetermined constant corresponding to the first parameter with the smallest value of the plurality of first parameters as the optimal undetermined constant.

17. The display compensation method for the display screen according to claim 1, wherein among the compensation gray scales obtained from the function model, at least one compensation gray scale forms a first vector, and at least one target gray scale corresponding to the compensation gray scales forms a second vector; and the first parameter is any one of a Minkowski distance, a Euclidean distance, a Manhattan distance, or a Canberra distance, between the first vector and the second vector.

18. A display screen, comprising:

a plurality of sub-display areas;

a storage device configured to store the drive gray scales and the optimal compensation gray scales corresponding to the drive gray scales obtained by the display compensation method according to claim 1; and a plurality of source drive circuits corresponding to the plurality of sub-display areas, wherein the source drive circuit is configured to acquire the drive gray scale and the optimal compensation gray scale corresponding to the drive gray scale from the storage unit, and provide the optimal compensation gray scale corresponding to a current drive gray scale to a sub-display area corresponding to the source drive circuit.

19. A display compensation device for a display screen, comprising:

a charge coupled device (CCD) camera configured to acquire actual measured brightness values of sub-pixel units in the display screen at a plurality of target gray scales; and a signal generator configured to:

use a preset mapping relationship to obtain actual measured gray scales according to the actual measured brightness values, wherein the preset mapping relationship comprises a mapping relationship between the actual measured brightness values and the actual measured gray scales;

perform a constant acquisition operation at least once, wherein the constant acquisition operation comprises: based on a function model, substituting at least one target gray scale of the plurality of target gray scales into a dependent variable of the function model, and substituting the actual measured gray scales corresponding to the at least one target gray scale into an independent variable of the function model to construct at least one equation comprising an undetermined constant, and acquiring the undetermined constant based on the at least one equation; wherein, in the function model, a compensation gray scale is the dependent variable, a drive gray scale is the independent variable, and the function model comprises at least one undetermined constant;

substitute the actual measured gray scales corresponding to at least a portion of remaining target gray scales into the independent variable of the function model to obtain the compensation gray scales corresponding to the at least a portion of the remaining target gray scales;

acquire, based on the compensation gray scales obtained from the function model, a first parameter according to at least one group of the compensation gray scale and the target gray scale corresponding to the compensation gray scale, wherein the first parameter characterizes a degree of difference between the compensation gray scale and the corresponding target gray scale; and acquire an optimal undetermined constant based on the first parameter, and acquiring the compensation gray scales corresponding to respective drive gray scales as optimal compensation gray scales based on the function model with the optimal undetermined constant.

20. The display compensation device for the display screen according to claim 19, wherein the preset mapping relationship is:

$$GL=\left(L/\left(2^{j}-1\right)\right)^{1/gam}\times\left(2^{k}-1\right);$$

wherein L represents the actual measured brightness value, GL represents the actual measured gray scale, gam represents a gamma value, and j and k are positive integers greater than or equal to 1.

* * * * *